United States Patent Office 3,714,175
Patented Jan. 30, 1973

3,714,175
CERTAIN-1-ARYL-3-SUBSTITUTED BENZAMIDO-2-PYRROLIDINONES
Suzu Shigezane, Urawa, Fusaji Naoi, Tokyo, Seiichi Saito, Urawa, Michio Kojima, Nara, and Ryuichi Ishida, Osaka,, Japan, assignors to Tanabe Seiyaku Co., Ltd., Osaka, Japan
No Drawing. Filed July 28, 1971, Ser. No. 172,345
Claims priority, application Japan, Aug. 14, 1970, 45/71,533
Int. Cl. C07d *31/44, 27/08*
U.S. Cl. 260—295 AM        8 Claims

ABSTRACT OF THE DISCLOSURE

A pyrrolidinone compound of the formula:

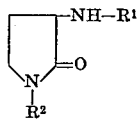

wherein $R^1$ is hydrogen or methyl, $R^2$ is phenyl, halogenophenyl, methoxyphenyl, trifluoromethyl-phenyl or nitrophenyl, is reacted with a carboxyl compound of the formula:

$$R^3—COOH$$

wherein $R^3$ is dihalogenophenyl, trimethoxypehnyl or pyridyl, or the corresponding acid halide, acid anhydride or mixed anhydride. N-acylamino-pyrrolidinone compounds of the formula:

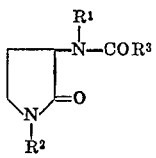

wherein $R^1$, $R^2$ and $R^3$ are as defined above, are produced. The N-acylamino-pyrrolidinone compounds in which $R^3$ is pyridyl, enable to form pharmaceutically acceptable acid addition salts. These compounds are useful as central muscle relaxant.

---

This invention relates to novel N-acylamino-pyrrolidinone derivatives and a process for preparing same. More particularly, it relates to the derivatives represented by the formula:

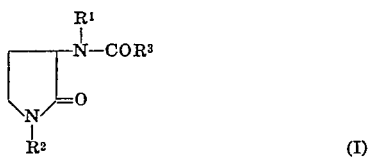

wherein $R^1$ is a hydrogen atom or methyl radical, $R^2$ is a phenyl, halogenophenyl, methoxyphenyl, trifluoromethylphenyl or nitrophenyl radical, $R^3$ is a dihalogenophenyl, trimethoxyphenyl or pyridyl radical.

We have now found that the N-acylamino-pyrrolidinone derivatives (I) of the present invention are useful as central muscle relaxant. The muscle relaxing activity of 1-and dl-1-(p-chlorophenyl)-3-(N-methyl-N-nicotinoylamino)-2-pyrrolidinone,
1-1-(p-chlorophenyl)-3-(N-methyl-N-picolinoyl-amino)-2-pyrrolidinone,
1-1-(p-fluorophenyl)-3-(N-methyl-N-nicotinoyl-amino)-2-pyrrolidinone and
1-(m-trifluoromethyl-phenyl)-3-(N-methyl-N-nicotinoyl-amino)-2-pyrrolidinone are comparable or superior to that of Chlormezanone (Chemical name: 2-(4-chlorophenyl)-3-methyl-4-methathiazanone 1,1-dioxide). For instance, when 1-1-(p-chlorophenyl)-3-(N-methyl-N-nicotinoyl - amino) - 2 - pyrrolidinone is administered orally to male mice, the $ED_{50}$ of the muscle relaxing activity (traction test) of the compound is 179 mg./kg. Alternatively, the $ED_{50}$ of chlormezanone is 289 mg./kg.

The N-acylamino-pyrrolidinone derivatives (I) also have a potent anti-inflammatory and analgesic activity. When 1 or dl-1-(p-chlorophenyl)-3-(N-methyl-N-nicotinoylamino)-2-pyrrolidinone is administered orally to rats at a dose of 100 mg./kg., the inhibitory activity thereof against carageenin-induced pow edema is comparable to that of phenylbutazone. In addition, 1- or dl-1-(p-chlorophenyl) - 3 - (N - methyl-N-nicotinoyl-amino)-2-pyrrolidinone also shows the analgesic activity (Haffner test) which is comparable to that of aminopyrine.

The acute toxicity of the derivatives (I) of the present invention are relatively low. When administered orally to male mice, the $LD_{50}$ of 1 and dl-1-(p-chlorophenyl)-3-(N - methyl-N-nicotinoyl-amino)-2-pyrrolidinone are respectively 772 and 941 mg./kg.

According to the present invention, the N-acylaminopyrrolidinone derivative (I) can be prepared by reacting a pyrrolidinone compound having the formula:

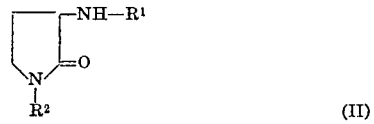 (II)

wherein $R^1$ and $R^2$ have the same meaning as defined above, with a carboxyl compound having the formula:

$$R^3—COOH \quad (III)$$

wherein $R^3$ has the same meaning as defined above, or a functional derivative thereof.

The starting materials (II) are readily obtainable. For instance, they may be prepared by treating 2-bromo-γ-butyrolactone with an aqueous solution containing a compound of the formula:

$$R^1—NH_2$$

wherein $R^1$ has the same meaning as defined above, and reacting the resultant product with an excess amount of a compound of the formula:

$$R^2—NH_2$$

wherein $R^2$ has the same meaning as defined above, for 2–3 days at 120°–130° C. (Chemical & Pharmaceutical Bulletin, vol. 12, pages 718–724).

The condensation reaction of the invention can be accomplished by conventional manner. For instance, the N-acylamino-pyrrolidinone derivative (I) is readily obtained by mixing the pyrrolidinone compound (II) and the carboxyl compound (III) in the presence of a carbodiimide agent. Preferred examples of the carbodiimide agent which may be employed in the present invention include N,N'-dicyclohexyl-carbodiimide and N-ethyl-N'-dimethylaminopropylcarbodiimide. Tetrahydrofuran, dichloromethane, chloroform and ether are suitable as the reaction solvent. It is preferred to carry out the reaction at a temperature lower than 0° C., especially at −5° to −10° C.

Alternatively, the functional derivative of the carboxyl compound (III) may be employed as one of the starting materials of the present invention. Preferred examples of the functional derivative are the corresponding acid anhydride, acid halide and mixed anhydride. When the acid anhydride of the carboxyl compound (III) is employed as the starting material, the condensation reaction of the pyrrolidinone compound (II) with said carboxyl compound (III) may be carried out at 20° to 110° C. Pyridine, dimethylformamide, dimethylsulfoxide and a mixture of ethyl acetate and pyridine are suitable as the reaction solvent. When the acid halide (e.g., acid bromide, acid chloride) of the carboxyl compound (III) is employed, the N-acylaminopyrrolidinone derivative (I) can be obtained by mixing the acid halide and the pyrrolidinone compound (II) in the presence of a basic agent. An organic base (e.g., pyridine, triethylamine) and an aqueous solution of an inorganic base (e.g., alkali metal carbonate, alkali metal hydroxide) are suitable as the basic agent. Acetone, chloroform, ethyl acetate and benzene may be suitably employed as the reaction solvent. In the latter case, however, it is not essential to use such a solvent. If the excess amount of an organic base is employed, it also serves as the reaction solvent. It is preferred to carry out the reaction at −20° to 50° C., especially at −5° to 5° C.

The mixed anhydride (i.e., O-alkoxycarbonyl derivative) of the carboxyl compound (III) may be prepared by treating the carboxyl compound (III) with an alkyl chloroformate (e.g., methyl chloroformate, ethyl chloroformate) in the presence of an organic base (e.g., pyridine, triethylamine). The reaction may be preferably carried out at −15° to 0° C. in an inert solvent. The condensation reaction of the pyrrolidinone compound (II) with the resultant mixed anhydride may be carried out at −20° to −30° C. Tetrahydrofuran, chloroform, dichloromethane and ethyl acetate are suitable as the reaction solvent.

Since the pyrrolidinone compound (II) has an assymetric carbon atom at its 3rd-position, there exists two optically active enantiomers. The condensation reaction of the present invention can be carried out by employing either an optically active isomer or a racemic mixture thereof, and the N-acylamino-pyrrolidinone derivative (I) can be obtained as the corresponding optically active or inactive form.

Among the N-acylamino-pyrrolidinone derivative (I) thus obtained, the compound of which $R^3$ is pyridyl radical can be employed as the free base or its salt. Preferred pharmaceutically acceptable salts of said compound are, for example, hydrochloride, hydrobromide, perchloride, nitrate, sulfate, phenylacetate, aminobenzoate, methanesulfonate, ethanesulfonate, benzenesulfonate, p-toluenesulfonate acid, sulfanilate, etc.

The N-acylamino-pyrrolidinone derivative (I) of the present invention may be incorporated within a pharmaceutical preparation in conjunction with or admixed with a pharmaceutical excipient that is suitable for enteral or parenteral administration. Excipients which do not react with the derivative (I) should be selected. Gelatin, lactose, glucose, sodium chloride, starch, magnesium stearate, talcum, vegetable oil, benzyl alcohol and gums are suitable. Other known medicinal excipients may be employed. The pharmaceutical preparation may be, for example, a solid dosage form such as a tablet, a coated tablet, a pill or a capsule; or a liquid dosage form such as, for example, a solution, a suspension or an emulsion.

The pharmaceutical preparation may be sterilized and/or may contain auxiliaries, such as preserving, stabilizing, wetting or emulsifying agents. The pharmaceutical preparation may further contain other therapeutically valuable substances.

Practical and presently-preferred embodiments of the present invention are illustratively shown in the following examples.

EXAMPLE 1

1.99 g. of dl-1-(p-chlorophenyl)-3-methylamino-2-pyrrolidinone hydrobromide and 1.48 g. of triethylamine are dissolved in 10 ml. of acetone. A solution of 1.47 g. of 2,4-dichlorobenzoyl chloride in 5 ml. of acetone is added dropwise to the solution under ice-cooling. The mixture is stirred for 2 hours at the same temperature, and the precipitated triethylamine salt is removed by filtration. The filtrate is concentrated under reduced pressure. The residue thus obtained is washed with ether and then recrystallized from a mixture of ethyl acetate and n-hexane. 2.6 g. of dl-1-(p-chlorophenyl)-3-[N-methyl-N-(2,4-dichlorobenzoyl)-amino]-2-pyrrolidinone are obtained as colorless needles. Yield: 82.0% M.P.: 109°–111° C.

EXAMPLE 2

3.70 g. of picolinic acid and 3.04 g. of triethylamine are dissolved in 30 ml. of tetrahydrofuran. 3.26 g. of ethyl chloroformate are added to the solution at −15° C. After 2 to 3 minutes, a solution of 6.74 g. of dl-1-(p-chlorophenyl)-3-methylamino-2-pyrrolidinone in 35 ml. of tetrahydrofuran is added to the solution at −15° to −10° C. The mixture is stirred for 3 hours at the same temperature. After the reaction is completed, the mixture is evaporated under reduced pressure to remove solvent. The residue thus obtained is dissolved in ethyl acetate. The ethyl acetate solution is washed with water, and then extracted with 10% aqueous hydrochloric acid three times repeatedly. The aqueous layers are combined. After neutralizing with sodium bicarbonate, the aqueous solution is extracted with ethyl acetate. The extract is washed with water, dried and then evaporated under reduced pressure to remove solvent. The residue thus obtained is recrystallized from a mixture of ethyl acetate and n-hexane. 7.8 g. of dl-1-(p-chlorophenyl)-3-(N-methyl-N-picolinoyl-amino)-2-pyrrolidinone are obtained as colorless granules. Yield: 78.8% M.P.: 138.5°–140° C.

EXAMPLE 3

2.2 g. of picolinic acid and 1.8 g. of triethylamine are dissolved in 25 ml. of tetrahydrofuran. 2.0 g. of ethyl chloroformate are added to the solution at −15° C. After 2 to 3 minutes, a solution of 3.0 g. of dl-1-phenyl-3-amino-2-pyrrolidinone in 20 ml. of tetrahydrofuran is added to the solution at −15° to −10° C. The mixture is stirred for 3 hours at the same temperature. After the reaction is completed, the mixture is evaporated under reduced pressure to remove solvent. The residue thus obtained is dissolved in benzene. The benzene solution is washed with water, dried and then evaporated under reduced pressure to remove solvent. The residue is recrystallized from a hot solution of ethyl acetate and a small amount of n-hexane. 3.46 g. of dl-1-phenyl-3-(N-picolinoylamino)-2-pyrrolidinone are obtained as colorless needles. Yield: 71.5%. M.P.: 137°–138.5° C.

EXAMPLE 4

3.9 g. of nicotinic acid anhydride and 30 g. of dl-1-phenyl-3-amino-2-pyrrolidinone are dissolved in 300 ml. of pyridine. The solution is heated for an hour at 70° to 80° C. Then, the solution is evaporated under reduced pressure to remove pyridine. The residue thus obtained is dissolved in ethyl acetate. The ethyl acetate solution is washed with an aqueous sodium bicarbonate solution, dried and then evaporated to remove solvent. The residue is recrystallized from hot ethanol. 3.49 g. of dl-1-phenyl-3-(N-nicotinoyl-amino)-2-pyrrolidinone are obtained. Yield: 73.0%. M.P.: 199°–202° C.

EXAMPLE 5

2.3 g. of nicotinic acid anhydride and 2.24 g. of dl-1-(p-chlorophenyl)-3-methylamino-2-pyrrolidinone are dissolved in 15 ml. of pyridine. The solution is heated for 24 hours at 70° to 80° C. Then, the solution is evaporated under reduced pressure to remove solvent. The residue thus obtained is dissolved in ethyl acetate. The ethyl acetate solution is washed with an aqueous sodium bicarbonate solution and water. After drying, the solution is evaporated under reduced pressure to remove solvent. Ether is added to the residue, and the precipitated crystals are collected by filtration. The crystals are recrystallized from a mixture of ethyl acetate and n-hexane. 2.45 g. of dl-1-(p-chlorophenyl)-3-(N-methyl-N-nicotinonyl-amino)-2 - pyrrolidinone are obtained as colorless needles. Yield: 74.3%. M.P.: 109°–109.5° C.

EXAMPLE 6

1.4 g. of isonicotinic acid anhydride and 1.5 g. of dl-1-(p-chlorophenyl)-3-methylamino-2-pyrrolidinone are dissolved in 15 ml. of pyridine. The solution is heated for 24 hours at 70° to 80° C. Then, the solution is evaporated under reduced pressure to remove pyridine. The residue thus obtained is dissolved in ethyl acetate. The ethyl acetate solution is washed with an aqeuous sodium bicarbonate solution and water. After drying, the solution is evaporated under reduced pressure to remove solvent. The residue is recrystallized from hot ethyl acetate. 1.54 g. of dl-1-(p-chlorophenyl)-3-(N - methyl - N - isonicotinoyl-amino)-2-pyrrolidinone are obtained. Yield: 78.2%. M.P.: 179°–181° C.

EXAMPLE 7

1.6 g. of picolinic acid and 1.3 g. of triethylamine are dissolved in 10 ml. of tetrahydrofuran. 1.4 g. of ethyl chloroformate are added to the solution at −15° C. After 2 to 3 minutes, a solution of 2.86 g. of dl-1-(p-methoxyphenyl)-3-methylamino-2-pyrrolidinone in 20 ml. of tetrahydrofuran is added to the solution at −15° to −10° C. The mixture is stirred for 3 hours at the same temperature. After the reaction is completed, the mixture is evaporated under reduced pressure to remove solvent. The residue thus obtained is dissolved in ethyl acetate. The ethyl acetate solution is washed with water, and then extracted with 10% aqueous hydrochloric acid three times repeatedly. The aqueous layers are combined. After neutralizing with sodium bicarbonate, the aqueous solution is extracted with ethyl acetate. The extract is washed with water, dried and then evaporated under reduced pressure to remove solvent. The residue thus obtained is recrystallized from a hot solution of ethyl acetate and n-hexane. 3.26 g. of dl-1-(p-methoxyphenyl)-3-(N-methyl-N-picolinoyl-amino) - 2-pyrrolidinone are obtained. Yield: 77.1%. M.P.: 103°–107° C.

EXAMPLE 8

1.8 g. of nicotinic acid anhydride and 1.8 g. of dl-1-(m-trifluoromethyl-phenyl)-3-methylamino - 2 - pyrrolidinone are dissolved in 10 ml. of pyridine. The solution is heated for 24 hours at 70° to 80° C. Then, the solution is evaporated under reduced pressure to remove pyridine. The residue thus obtained is dissolved in ethyl acetate. The ethyl acetate solution is washed with an aqueous sodium bicarbonate solution and water. After drying, the solution is evaporated under reduced pressure to remove solvent. A solution of 2.5% hydrochloric acid-methanol is added to the residue, and the precipitated crystals are collected by filtration. The crystals are recrystallized from hot ethanol. 2.35 g. of dl-1-(m-trifluoromethyl-phenyl)-3-(N-methyl-N-nicotinoyl-amino)-2 - pyrrolidinone hydrochlonone are obtained. Yield: 76.7%. M.P.: 177°–181° C.

EXAMPLE 9

0.912 g. of nicotinic acid anhydride and 0.823 g. of dl-1-(p-nitrophenyl)-3-methylamino-2-pyrrolidinone are dissolved in 7 ml. of pyrridine. The solution is heated for 24 hours at 70° to 80° C. Then, the solution is evaporated under reduced pressure to remove pyridine. The residue thus obtained is washed with an aqueous sodium bicarbonate solution and water. After drying, the residue is recrystallized from hot ethanol. 0.89 g. of dl-1-(p-nitrophenyl)-3-(N-methyl-N-nicotinoyl-amino) - 2 - pyrrolidinone are obtained. Yieldff 76.7%. M.P.: 177°–181° C.

EXAMPLE 10

2.1 g. of 2,3,4-trimethoxybenzoic acid and 2.2 g. of dl-1-(p-chlorophenyl)-3-methylamino-2-pyrrolidinone are dissolved in 10 ml. of dichloromethane. A solution of 2.1 g. of N,N'-dicyclohexylcarbodiimide in 5 ml. of dichloromethane is added to the solution under ice-cooling. The mixture is allowed to stand overnight, and then evaporated under reduced pressure to remove solvent. The residue thus obtained is dissolved in ethyl acetate. The ethyl acetate solution is washed with 10% aqueous hydrochloric acid, water and an aqueous sodium bicarbonate solution, successively. After drying, the solution is evaporated to remove solvent. The residue thus obtained is recrystallized form a mixture of ethyl acetate and n-hexane. 2.95 g. of dl-1-(p-chlorophenyl)-3-[N-methyl-N-(2,3,4 - trimethoxybenzoyl)-amino]-2-pyrrolidinone are obtained as colorless needles. Yield: 70.8%. M.P.: 128°–132° C.

EXAMPLE 11

0.474 g. of picolinic acid and 0.351 of triethylamine are dissolved in 10 ml. of tetrahydrofuran. A solution of 0.377 g. of ethyl chloroformate in 5 ml. of tetrahydrofuran is added to the solution at −15° to −10° C. under stirring. After 2 to 3 minutes, a solution of 0.786 g. of 1-1-(p-chlorophenyl)-3-methylamino-2-pyrrolidinone in 5 ml. of tetrahydrofuran is added to the solution at the same temperature. The mixture is stirred for 3 hours. After the reaction is completed, the mixture is evaporated on a water bath (water temperature: 40°–50° C.) to remove solvent. The residue thus obtained is dissolved in ethyl acetate. The ethyl acetate solution is washed with water, an aqueous sodium bicarbonate solution and water, successively. Then, the ethyl acetate solution is extracted with 10% hydrochloric acid three times repeatedly. The aqueous extracts are combined, washed with ethyl acetate and then alkalified with potassium carbonate. The oily product liberated from the extract is re-extracted with ethyl acetate. The ethyl acetate extract is washed with water, dried and then evaporated to remove solvent. The residue thus obtained is recrystallized from a mixture of ethyl acetate and n-hexane. 0.784 g. of 1-1-(p-chlorophenyl)-3-(N-methyl-picolinoyl-amino) - 2-pyrrolidinone are obtained. Yield: 68.2%. M.P.: 88°–89° C. $[\alpha]_D^{25}$: −85° (C.=1, methanol).

EXAMPLE 12 d-1-(p-chlorophenyl) - 3-methylamino-2-pyrrolidinone is treated in the same manner as described in Example 11. d-1 - (p-chlorophenyl)-3-(N-methyl-N-picolinoyl-amino)-2-pyrrolidinone is obtained. Yield: 67.3%. M.P.: 85.5°–87° C. $[\alpha]_D^{25}$: +90° (C.=1, methanol).

EXAMPLE 13

1.60 g. of nicotinic acid anhydride and 1.57 g. of 1-1-(p-chlorophenyl)-3-methylamino-2-pyrrolidinone are dissolved in 10 ml. of pyridine. The solution is allowed to stand at room temperature overnight, and then evaporated under reduced pressure on a water bath (water temperature: 30°–35° C.) to remove solvent. The residue thus obtained is dissolved in ethyl acetate. The ethyl acetate solution is washed with an aqueous sodium bicarbonate solution and water. After drying, the solution is evaporated under reduced pressure to remove solvent. The residue is recrystallized from a mixture of ethyl acetate and n-hexane. 1.60 g. of 1-1-(p-chlorophenyl)-3-(N-methyl-N-nicotinoyl-amino) - 2 - pyrrolidinone are obtained. Yield: 70.0%. M.P.: 119°–119.5° C. $[\alpha]_D$: −101.8° (C.=1.08, ethanol).

EXAMPLE 14 d-1-(p-chlorophenyl)-3-methylamino-2-pyrrolidinone is treated in the same manner as described in Example 13. d-1-(p-chlorophenyl) - 3-(N-methyl-N-nicotinoyl-amino)-2-pyrrolidinone is obtained. Yield: 69.3%. M.P. 120.5°–121° C. $[\alpha]_D^{25}$: −104.3° (C.=1.53, ethanol).

EXAMPLE 15

2.41 g. of nicotinic acid anhydride and 2.0 g. of dl-1 - (p-fluorophenyl)-3-methylamino-2-pyrrolidinone are dissolved in 50 ml. of pyridine. The solution is allowed to stand at room temperature overnight, and then treated in the same manner as described in Example 13. The residue thus obtained is recrystallized from a mixture of ethyl acetate and n-hexane. 2.06 g. of dl-1-(p-chlorophenyl) - 3 - (N-methyl-N-nicotinoyl-amino)-2-pyrrolidinone are obtained as colorless needles. Yield: 69%. M.P. 97°–98° C.

What we claim is:
1. A compound represented by the formula:

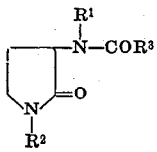

wherein $R^1$ is a hydrogen atom or methyl radical, $R^2$ is a phenyl, halogenophenyl, methoxyphenyl, trifluoromethyl-phenyl or nitrophenyl radical, $R^3$ is a dihalogenophenyl, trimethoxyphenyl or pyridyl radical.

2. The compound as claimed in claim 1, wherein $R^1$ is methyl radical.

3. The compound as claimed in claim 1, wherein $R^2$ is a phenyl, p-chlorophenyl, p-fluorophenyl, p-methoxyphenyl, m-trifluoromethyl-phenyl or p-nitrophenyl radical.

4. The compound as claimed in claim 1, wherein $R^3$ is a 2-pyridyl, 3-pyridyl or 4-pyridyl radical, or a pharmaceutically acceptable acid addition salt thereof.

5. The compound as claimed in claim 1, wherein $R^1$ is methyl radical, $R^2$ is p-chlorophenyl radical and $R^3$ is 3-pyridyl radical, or a pharmaceutically acceptable acid addition salt thereof.

6. The compound as claimed in claim 1, wherein $R^1$ is methyl radical, $R^2$ is p-chlorophenyl radical and $R^3$ is 2-pyridyl radical, or a pharmaceutically acceptable acid addition salt thereof.

7. The compound as claimed in claim 1, wherein $R^1$ is methyl radical, $R^2$ is p-pfluorophenyl radical and $R^3$ is 3-pyridyl radical, or a pharmaceutically acceptable acid addition salt thereof.

8. The compound as claimed in claim 1, wherein $R^1$ is methyl radical, $R^2$ is m-trifluoromethyl-phenyl radical and $R^3$ is 3-pyridyl radical, or a pharmaceutically acceptable acid addition salt thereof.

References Cited
UNITED STATES PATENTS
3,517,440   5/1971   Lunsford et al. ____ 260—326.3

OTHER REFERENCES
Knobler et al.: J. Org. Chem., vol. 29, (5), pp. 1229–36 (1964).

ALAN L. ROTMAN, Primary Examiner

U.S. Cl. X.R.
260—326.3; 424—266, 274